United States Patent [19]

Plzak

[11] Patent Number: 5,016,448
[45] Date of Patent: May 21, 1991

[54] INTERNAL HEAT EXCHANGER FOR AN ABSORPTION APPARATUS

[75] Inventor: William J. Plzak, La Crescent, Minn.

[73] Assignee: American Standard Inc., New York, N.Y.

[21] Appl. No.: 118,679

[22] Filed: Nov. 9, 1987

[51] Int. Cl.[5] .......................................... F25B 15/00
[52] U.S. Cl. ...................................... 62/476; 62/483; 62/485; 62/487
[58] Field of Search ................. 62/107, 476, 483, 485, 62/487

[56] References Cited

U.S. PATENT DOCUMENTS

| | | | |
|---|---|---|---|
| 1,455,701 | 5/1923 | Altenkirch | 62/487 |
| 2,378,177 | 6/1945 | Bichowsky | 62/489 X |
| 2,729,952 | 1/1956 | Whitlow | 62/487 X |
| 3,158,008 | 11/1964 | Aronson | 62/476 |
| 3,225,556 | 12/1965 | Rohrs | 62/141 |
| 3,262,282 | 7/1966 | Aronson | 62/141 |
| 3,296,824 | 1/1967 | Rohrs et al. | 62/487 |
| 3,357,202 | 12/1967 | Holman et al. | 62/476 |
| 3,473,347 | 10/1969 | Andrews et al. | 62/483 X |
| 3,553,977 | 1/1971 | Holman | 62/489 |
| 3,575,012 | 4/1971 | Peckham | 62/476 |
| 3,740,966 | 6/1973 | Pravda | 62/476 |
| 3,828,575 | 8/1974 | Malcosky | 62/476 |
| 3,964,273 | 6/1976 | Merrick | 62/476 |
| 4,078,399 | 3/1978 | Sugimoto et al. | 62/476 |
| 4,090,372 | 5/1978 | Lamb | 62/476 X |
| 4,100,756 | 7/1978 | Albertson | 62/476 X |
| 4,442,677 | 4/1984 | Kauffman | 62/485 X |
| 4,462,222 | 7/1984 | Sugimoto et al. | 62/476 |
| 4,487,026 | 12/1984 | Alfano | 62/476 X |
| 4,487,036 | 12/1984 | Itoh | 62/476 X |

FOREIGN PATENT DOCUMENTS 680028  2/1964  Canada .................................. 62/476

Primary Examiner—Lloyd L. King
Attorney, Agent, or Firm—William J. Beres; Robert J. Harter; William O'Driscoll

[57] ABSTRACT

A hermetic shell of an absorption refrigeration apparatus contains an internally mounted heat exchanger that minimizes external piping. The internally mounted heat exchanger provides a means for exchanging two solutions having unequal portions of lithium bromide and water between a generator and an absorber, both of which are also contained within the shell. The solution having the higher concentration of lithium bromide leaves the generator and preheats the incoming dilute solution as the two solutions pass through the heat exchanger. The heat exchanger is located adjacent to both the generator and the absorber so that the concentrated solution can be conveyed internally through the shell from the generator to the absorber without relying on external piping.

9 Claims, 3 Drawing Sheets

INTERNAL HEAT EXCHANGER FOR AN ABSORPTION APPARATUS

DESCRIPTION

1. Technical Field

The subject invention generally pertains to an absorption refrigeration system, and more specifically to a solution heat exchanger that preheats a dilute solution being conveyed from the absorber to the generator.

2. Background of the Invention

A typical absorption apparatus includes a generator, a condenser, an evaporator, and an absorber, all contained within a hermetically sealed refrigeration circuit. The working fluid within the system usually consists of a lithium bromide and water solution, with the concentration of the lithium bromide varying throughout the system.

A refrigeration cycle can be considered to begin as the generator boils the solution to release essentially pure water vapor which subsequently condenses in the condenser. The condensed water serves as a refrigerant as it leaves the condenser and enters the evaporator by way of an expansion device. The expansion device, typically comprising a set of spray nozzles, lowers the water's pressure and temperature to provide a cooling effect wherever needed. After providing the cooling effect, the water vapor is reabsorbed in the absorber by a spray of solution having a relatively high concentration of lithium bromide. The relatively concentrated solution is supplied by the generator as a by-product resulting from the release of water vapor as the generator boils its solution. Once the absorber reabsorbs the water vapor to produce a dilute liquid solution of lithium bromide and water, the dilute solution is pumped from the absorber and returning to the generator to replenish its supply of solution, thereby completing the refrigeration cycle.

For greater efficiency, the dilute solution being supplied to the generator is often preheated by the relatively hot concentrated by-product leaving the generator. This is accomplished by employing a solution heat exchanger that transfers heat from the hot solution leaving the generator to the relatively cool solution being conveyed from the absorber to the generator. Present absorption system designs have the heat exchanger located outside the hermetic shell (or shells) that contain the generator and the absorber. With such designs, however, external piping is required to convey solution to and from the heat exchanger. The external piping as well as the externally mounted heat exchanger itself weakens the hermetic integrity of the system and also adds unnecessary piping losses and bulk. Therefore, an object of the invention is to locate the solution heat exchanger inside the same hermetic shell that contains the generator to minimize joints that could effect the hermetic integrity of the absorption system.

Another object is to mount a solution heat exchanger and much of its associated piping inside the outer shell of an absorption apparatus to minimize the system's overall bulk.

Yet another object is to deliver concentrated solution from the generator to the absorber by conveying it through the interior of an absorption unit's outer shell to minimize external piping and its associated piping losses.

A further object is to convey concentrated solution from the generator to the absorber through the interior of an absorption unit's outer shell while pumping a less concentrated solution from the absorber to the generator using a centrifugal pump located outside the outer shell.

A still further object is to mix, within an absorption chamber of an absorption apparatus, a concentrated solution supplied by the generator with a relatively weak solution being recirculated through the absorption chamber.

These and other objects of the invention will be apparent from the attached drawings and Description Of The Preferred Embodiment which follows hereinbelow.

SUMMARY OF THE INVENTION

An absorption refrigeration apparatus includes a hermetic shell that contains an internal solution heat exchanger that conveys fluid being exchanged between a generator and an absorber, both of which are also disposed inside the shell. A centrifugal pump located outside the shell pumps a weak solution from the absorber to the generator, while a strong solution being conveyed from the generator to the absorber passes only through the interior of the shell.

DESCRIPTION OF THE PREFERRED EMBODIMENT

Figure 1:
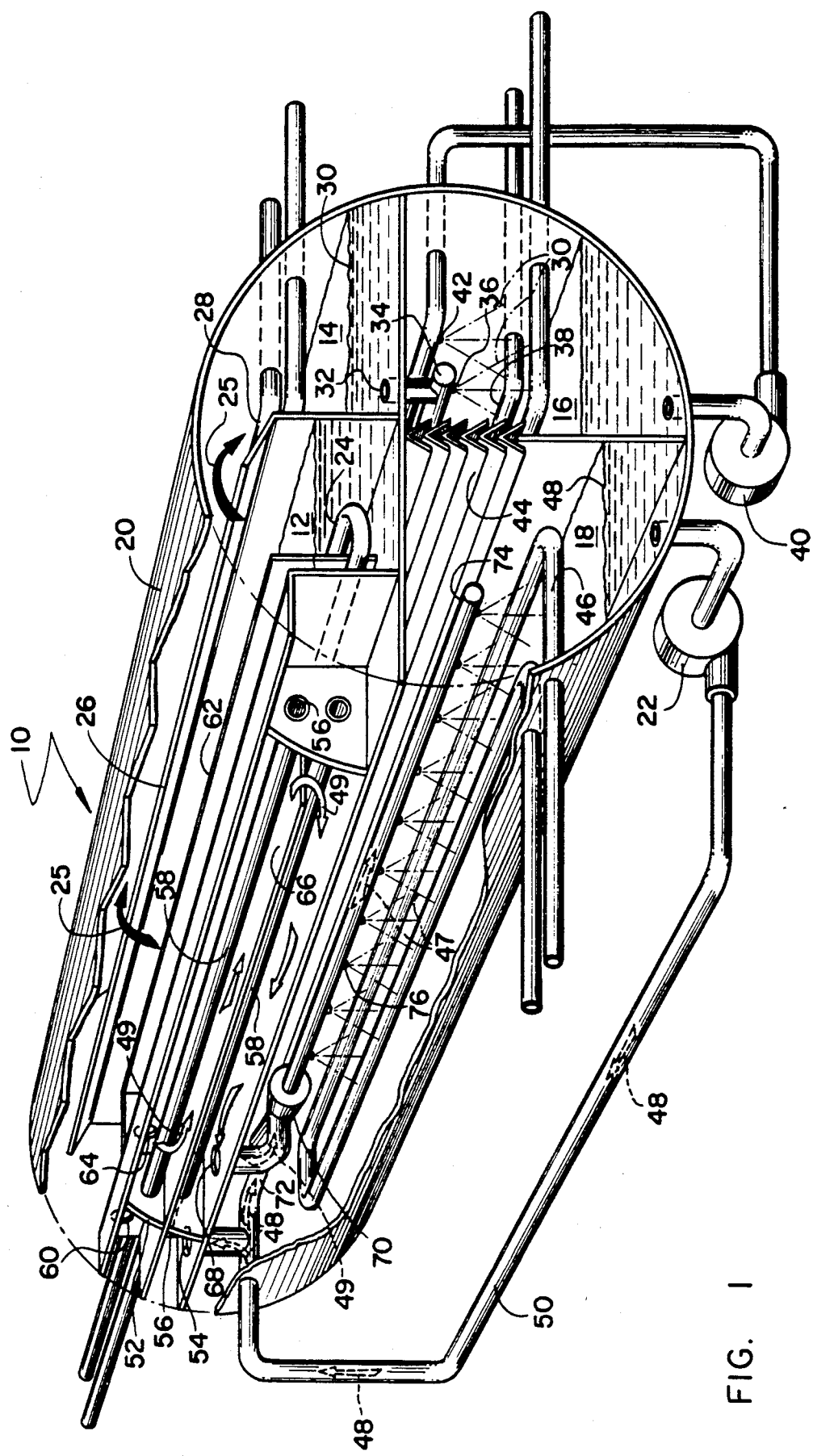
FIG. 1 illustrates a cut-away view of the preferred embodiment of the invention.

An absorption apparatus 10, shown in FIG. 1, comprises four primary chambers which include a generator 12, a condenser 14, an evaporator 16, and an absorber 18. The four chambers are all located inside a single generally cylindrical hermetic shell 20.

A solution of lithium bromide and water circulates among the four chambers to provide a refrigeration cycle. The solution's concentration of lithium bromide varies as it passes through its cycle. In the order of decreasing concentration of lithium bromide in water, the solution will be referred to hereinbelow as a strong solution, intermediate solution, weak solution, and refrigerant, with the refrigerant representing substantially pure water with only traces of lithium bromide.

A centrifugal pump 22, mounted outside of shell 20, delivers solution from absorber 18 to generator 12. The solution is heated in generator 12 by steam (or hot liquid) coils 24 that vaporize dissolved refrigerant to maintain generator 12 and condenser 14 at a higher pressure than evaporator 16 and absorber 18. The vaporized refrigerant 25 separates from the solution and passes over a divider 26 to enter condenser 14, leaving behind a strong liquid solution 49 in generator 12.

Cooling coils 28 condense the refrigerant, and depending on the rate of condensation, may even cause it to accumulate as a liquid 30 at the bottom of condenser 14. The liquid refrigerant 30, being at a higher pressure than that which is maintained in evaporator 16, exits condenser 14 by way of an outlet 32 and a manifold 34 having several nozzles 36 for spraying the refrigerant 25 or 30 over evaporator coils 38. As the refrigerant passes through nozzles 36, its pressure and temperature drops to cool the evaporator coils 38 which in turn circulates chilled water (or glycol) to wherever its needed. The liquid refrigerant is recirculated across coils 38 by means of a pump 40 and another set of spray nozzles 42. As the refrigerant absorbs heat from coils 38, the refrigerant vaporizes and migrates through a mist separator 44 and into absorber 18. Mist separator 44 is simply a row of diagonal baffles that places evaporator 16 in fluid communication with absorber 18 while inhibiting liquid from spraying across the two chambers 16 and 18.

Once in absorber 18, the vaporized refrigerant contacts a set of cooling coils 46 that have been externally wetted by an intermediate solution 47. The intermediate solution absorbs the refrigerant to produce a weak solution 48 that runs off cooling coils 46 and collects at the bottom of absorber 18.

Pump 22 delivers the weak solution from absorber 18 to generator 12 to replenish the generator's supply of solution. Weak solution 48 discharged by pump 22 is conveyed along line 50 and enters a generator-absorber heat exchanger 52 at its inlet 54. The weak solution passes through opening 56, makes a double pass through the interior of heat exchanger tubes 58 and enters generator 12 through opening 60.

After entering generator 12, the weak solution travels around a baffle 62 while steam coils 24 heat the solution and vaporize its water until the solution becomes a relatively hot, strong solution 49 upon reaching opening 64. The strong solution 49 leaves generator 12 and re-enters heat exchanger 52 through opening 64. Once inside heat exchanger 52, the strong solution 49 passes over the exterior of tubes 58, preheating the incoming weak solution 48 being conveyed through the interior of tubes 58. The strong solution 49 passes around a baffle 66 and exits the heat exchanger by way of an outlet opening 68. The strong solution 49 is subsequently drawn into an eductor 70 that also receives a supply of weak solution 48 from pump 22 via line 72. Eductor 70 provides a means for mixing the strong solution 49 with the weak solution 48 to produce the intermediate solution 47. The intermediate solution 47 is discharged from eductor 70 and is supplied to manifold 74. Manifold 74 includes several spray nozzles 76 that distribute the intermediate solution 47 over coils 46, thereby wetting the coils and completing the refrigeration cycle.

Heat exchanger 52 is located inside shell 20 and adjacent to both generator 12 and absorber 18. It strategic location eliminates the need for external piping from heat exchanger 52 to absorber 18 by using outlet opening 68 which provides an internal means for conveying a strong solution 49 from generator 12 to absorber 18. Its location also facilitates a mixing means, such as eductor 70, to be disposed inside shell 20, yet allows pump 22 to be mounted outside the shell for ready access.

It should be noted that there are several other possible variations of the preferred embodiment that still lie within the scope of the invention. For example, tubes 58 and coils 24, 28, 38, and 46 could each comprise tube bundles in a variety of configurations, and the lithium bromide and water solution can be replaced by an ammonia and water solution.

Figure 2:
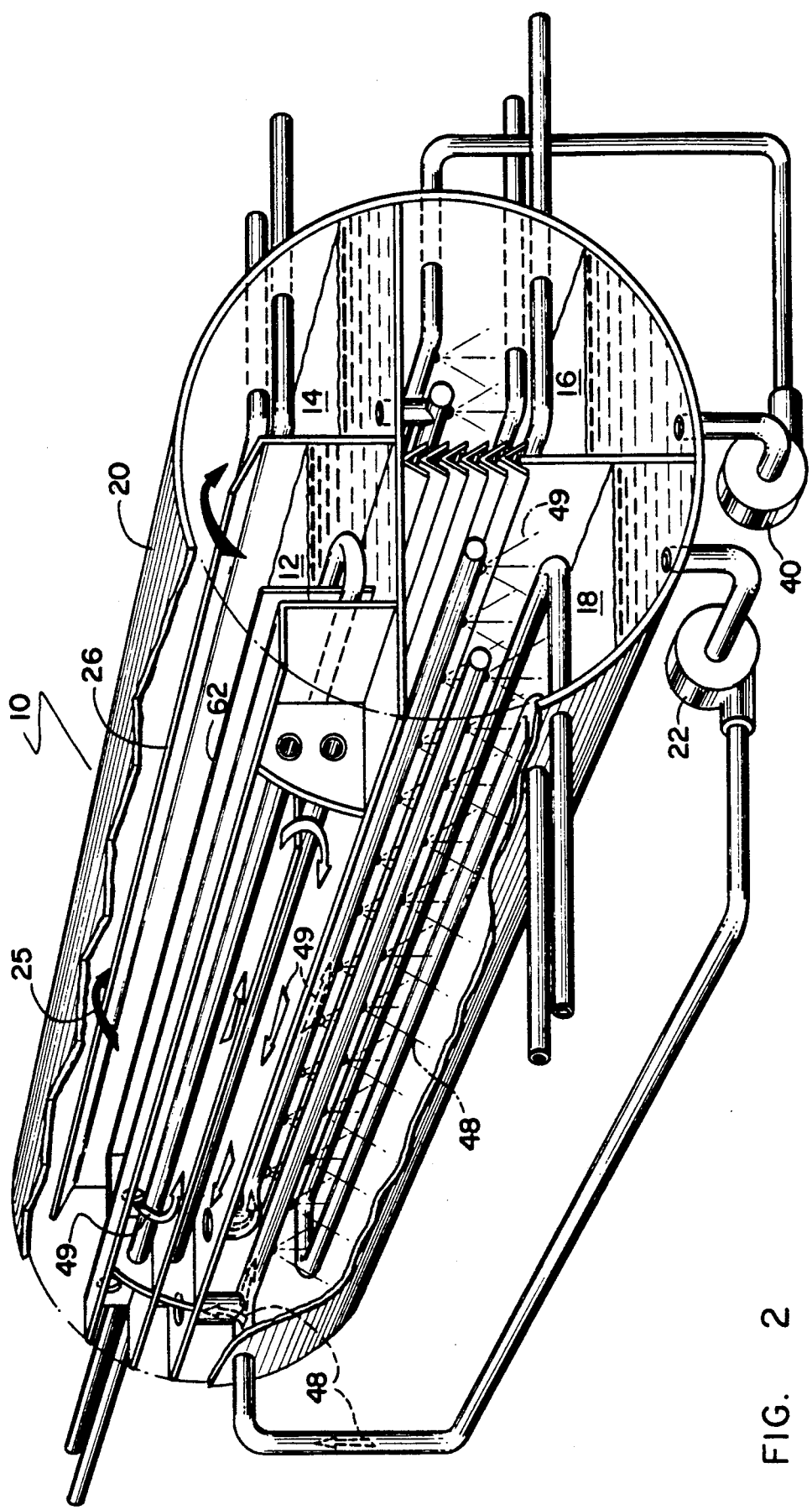
FIG. 2 illustrates another embodiment of the invention.

Referring to FIG. 2, the invention can also be modified so that the strong solution 49 entering the absorber is distributed directly over the absorber's cooling coil 46 by using a second set of spray nozzles 78 instead of an eductor. Without the eductor, the mixing of the weak solution 48 with the strong solution 49 still occurs inside the absorber.

Figure 3:
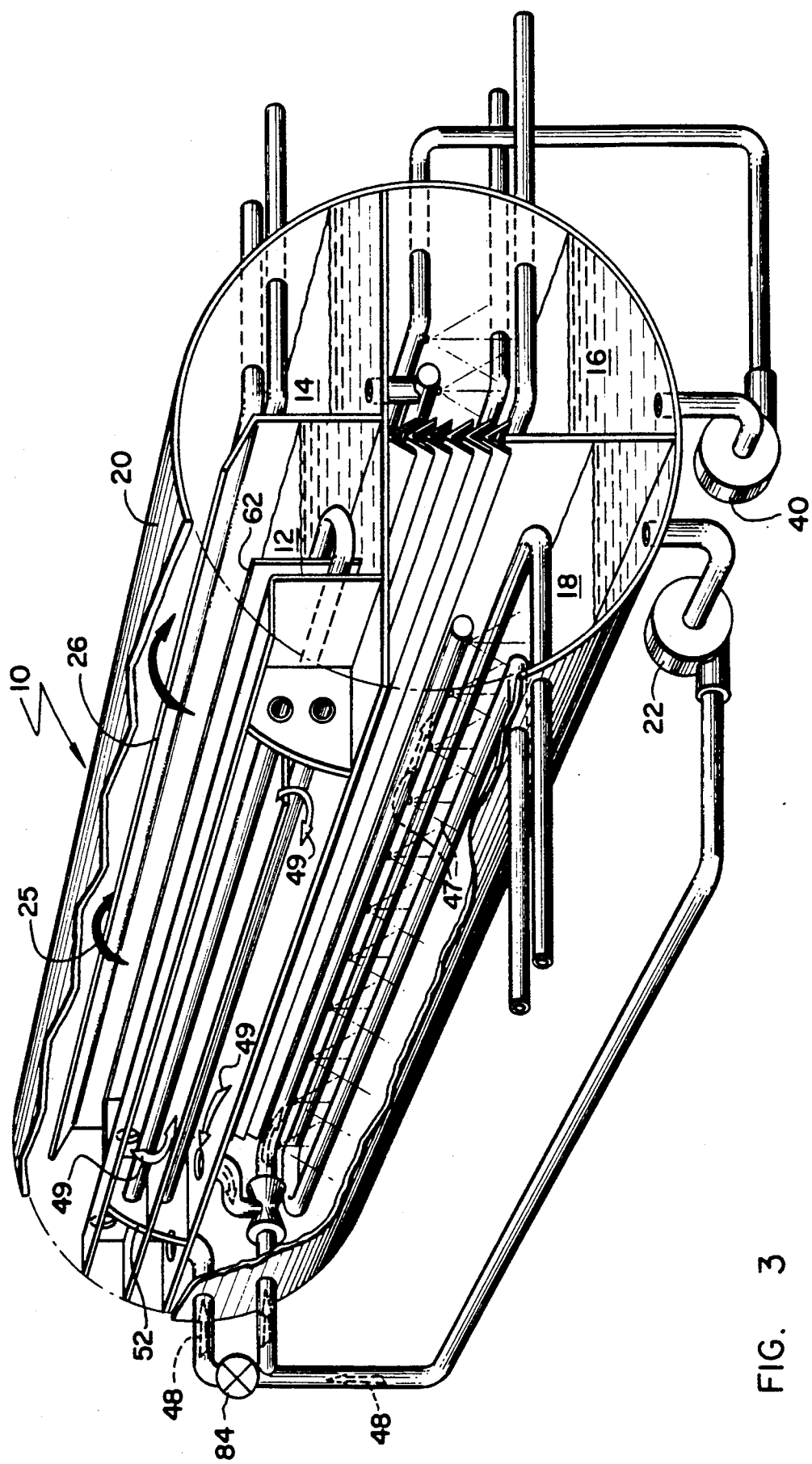
FIG. 3 illustrates a third embodiment of the invention which includes a capacity regulating valve.

FIG. 3 illustrates another embodiment where a valve 84 is disposed upstream of heat exchanger 52 to regulate the generator's incoming supply of weak solution 48 to provide a means to regulate the capacity of the absorption apparatus.

Although the invention is described with respect to a preferred embodiment, modifications thereto will be apparent to those skilled in the art. Therefore, the scope of the invention is to be determined by reference to the claims which follow.

I claim:

1. An absorption refrigeration apparatus comprising:
   a. a hermetic shell;
   b. a generator and an absorber disposed inside side shell;
   c. means, contained inside said shell, for conveying a strong solution from said generator to said absorber; and
   d. a pump, disposed outside said shell for pumping a weak solution from said absorber to said generator, further comprising means, disposed inside said shell, for mixing said weak and said strong solutions, said means for mixing being an eductor.

2. An absorption refrigeration apparatus comprising:
   a. a hermetic shell;
   b. a generator and an absorber disposed inside side shell;
   c. means, contained inside said shell, for conveying a strong solution from said generator to said absorber; and
   d. a pump, disposed outside said shell for pumping a weak solution from said absorber to said generator, further comprising means, disposed inside said shell, for mixing said weak and said strong solutions, and further comprising a nozzle for spraying said weak solution into said absorber and another nozzle for spraying said strong solution into said absorber so that said solutions are free to mix inside said absorber to provide said means for mixing.

3. An absorption refrigeration apparatus comprising:
   a. a hermetic shell;
   b. a generator and an absorber disposed inside side shell;
   c. means, contained inside said shell, for conveying a strong solution from said generator to said absorber; and
   d. a pump, disposed outside said shell for pumping a weak solution from said absorber to said generator, wherein said pump is a centrifugal pump and said means for mixing being an eductor.

4. An absorption refrigeration apparatus comprising:
   a. a hermetic shell;
   b. a generator and an absorber disposed inside side shell;
   c. a solution heat exchanger disposed inside said shell for conveying a strong solution from said generator to said absorber; and
   d. a pump disposed outside said shell for pumping a weak solution from said absorber, through said heat exchanger, and into said generator; and
   e. means, disposed inside said shell, for mixing said weak and said strong solutions; further comprising a nozzle for spraying said weak solution into said absorber and another nozzle for spraying said strong solution into said absorber so that said solutions are free to mix inside said absorber to provide said means for mixing.

5. An absorption refrigeration apparatus comprising:
a. a generally cylindrical hermetic shell;
b. a generator, a condenser, an evaporator, and an absorber all contained inside said shell with said generator and said condenser being disposed in generally side-by-side relationship, and said absorber and said evaporator also being disposed in generally side-by-side relationship so that said generator is disposed generally above said absorber and said condenser is disposed generally above said condenser;
c. a solution heat exchanger disposed inside said shell for conveying a strong solution from said generator to said absorber;
d. a centrifugal pump disposed outside said shell for pumping a weak solution from said absorber, through said heat exchanger, and into said generator;
e. means disposed inside said shell for mixing said weak and said strong solutions; and
f. a mist separator disposed inside said shell for placing said evaporator in fluid communication with said absorber while inhibiting liquid from passing therebetween.

6. The apparatus as recited in claim 5, wherein said means for mixing is an eductor.

7. The apparatus as recited in claim 5, further comprising a nozzle for spraying said weak solution into said absorber and another nozzle for spraying said strong solution into said absorber so that said solutions are free to mix inside said absorber to provide said means for mixing.

8. The apparatus as recited in claim 5, wherein said weak solution accumulates as a liquid at the bottom of said absorber and said strong solution is conveyed toward said liquid in fluid communication therewith to provide said means for mixing.

9. The apparatus as recited in claim 5, further comprising a regulating valve for regulating the flow rate of said weak solution being pumped through said heat exchanger.

* * * * *